United States Patent [19]

Keller

[11] Patent Number: 5,304,625

[45] Date of Patent: Apr. 19, 1994

[54] PHOSPHAZENE-CONTAINING AMINE AS CURING AGENT FOR PHTHALONITRILE-BASED POLYMER

[75] Inventor: Teddy M. Keller, Alexandria, Va.

[73] Assignee: The United States of America as represented by the Secretary of the Navy, Washington, D.C.

[21] Appl. No.: 19,956

[22] Filed: Feb. 19, 1993

Related U.S. Application Data

[62] Division of Ser. No. 670,096, Mar. 15, 1991, Pat. No. 5,208,318.

[51] Int. Cl.$^5$ ............................................. C08G 79/02
[52] U.S. Cl. .................................. 528/168; 528/125; 528/128; 528/167; 528/169; 528/183; 528/188; 528/362; 528/399
[58] Field of Search ............... 528/168, 169, 167, 125, 528/128, 183, 188, 362, 399

[56] References Cited

U.S. PATENT DOCUMENTS

| | | | |
|---|---|---|---|
| 4,223,123 | 9/1980 | Keller et al. | 528/362 |
| 4,226,801 | 10/1980 | Keller et al. | 528/362 |
| 4,234,712 | 11/1980 | Keller et al. | 528/362 |
| 4,238,601 | 12/1980 | Keller et al. | 528/362 |
| 4,408,035 | 10/1983 | Keller et al. | 528/362 |
| 5,003,039 | 3/1991 | Keller et al. | 528/362 |
| 5,132,396 | 7/1992 | Keller | 528/353 |
| 5,208,318 | 5/1993 | Keller | 528/168 |

OTHER PUBLICATIONS

Bis-, Tris-, and Tetrakis-Maleimidophenoxy-Triphenoxycyclotriphosphazene Resins for Fire- and Heat-Resistant Applications, Kumar et al., J of Polymer Science, vol. 21, pp. 3155–3167.

Fire- and Heat-Resistant Laminating Resins Based on Maleimido-Substituted Aromatic Cyclotriphosphazenes, Kumar et al., Macromolecules, vol. 16, No. 8, 1983.

A Study of Solution Polymerization of Polyphosphazenes, Mujumdar et al., Macromolecules 1990, vol. 23, pp. 14–20.

Zeldin et al., Inorganic and Inorganic Polymers, "Macromolecules Containing Silicon, Phosphorus, and Other Inorganic Elements," ACS Symposium Series 360, American Chemical Society, Washington, D.C. 1988, pp. 250–312.

Primary Examiner—Harold D. Anderson
Attorney, Agent, or Firm—Thomas E. McDonnell; Barry A. Edelberg

[57] ABSTRACT

Phosphazene-containing amines having at least one amine or substituted amine moiety reactive with nitrile groups of the phthalonitrile monomers or oligomeric resins are useful curing agents for phthalonitriles. Typically, the phosphazene-containing amines useful as curing agents in the present invention have the formula:

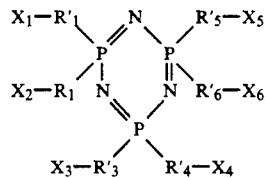

wherein each of $X_{1-6}$ is a hydrogen, an unsubstituted amine group, or an amine group substituted with $C_1$–$C_{12}$ alkyl groups or aromatic groups, at least one of $X_{1-6}$ includes an amine group, and each of $R'_{1-6}$ is an alkyl, aromatic, or alkyl-substituted aromatic moiety, or a linear polymer of the phosphazene-based amine monomer. The curing agents enhance the speed of cure and also add flame retardancy to the cured polymers.

15 Claims, No Drawings

PHOSPHAZENE-CONTAINING AMINE AS CURING AGENT FOR PHTHALONITRILE-BASED POLYMER

This application is a division of application Ser. No. 07/670,096 filed Mar. 15, 1991, now U.S. Pat. No. 5,208,318.

BACKGROUND OF THE INVENTION

1. Field of the Invention

This invention relates to the synthesis of phthalonitrile monomers and oligomeric resins and, more specifically, to phosphazene-containing amines used as curing agents for the polymerization of phthalonitrile monomers and oligomeric resins and a method therefor.

2. Description of the Prior Art

Interest in fiber-reinforced composites for advanced aerospace applications has led to the search for high temperature polymers that are easily processed and exhibit high thermal and oxidative stability. Epoxies and polyimides are now being used but each has its disadvantages. Conventional epoxy-based composites and adhesives have a 200° C. maximum service limit and polyimide resins used in composites matrices have a 300° C. maximum service limit. Advanced design concepts, especially in the aerospace industry, demand even higher temperature requirements for polymeric materials.

A major problem of the polyimide system is the inability to process void- and blister-free components in high yield because of the evolution of volatile components formed during the polymerization condensation reaction. Other problems associated with both polyimides and epoxies include their brittleness, water absorptivity and engineering reliability.

Phthalonitrile resins, such as diether-linked phthalonitrile resins, are proving to be superior in physical and chemical properties to epoxies, polyimides and other plastics as matrices for fiber-reinforced composites. A major advantage of phthalonitrile resins, compared to other plastics, is their ability to withstand temperatures in excess of 300° C. for extended periods without permanent damage to the coatings, plastics or composites made therefrom. Such resins usually contain a substantial proportion of aromatic structures, but cured polymers composed solely of aromatic rings tend to be brittle and intractable. A resin having flexible linkages between the aromatic rings minimizes or greatly reduces brittleness and intractability. Phthalonitrile resins with diether linkages are materials which meet these goals. Examples of these phthalonitrile-based polymers are found in U.S. Pat. Nos. 4,223,123; 4,226,801; 4,234,712; and 4,238,601 issued to T. M. Keller and J. R. Griffith, all of which are wholly incorporated herein by reference. However, polymerization and cure of these monomers in the neat state generally requires heating for several days at extremely high temperatures.

U.S. Pat. No. 4,408,035, wholly incorporated herein by reference, teaches curing of phthalonitrile monomers with a nucleophilic aromatic amine. The monomer, 4,4'-bis(3,4-dicyanophenoxy)biphenyl, has a melting point of 232°–234° C. The aromatic diamines covered in the above patent are somewhat volatile at the required processing melt temperature and potentially can cause void problems when used in an amount greater than 5% by weight. This is especially true if the amine is not dried before using as a curing agent. Thus, it is advantageous for a resin not to produce gaseous products when cured. Also, the chemical makeup of the polymer must be such that it consists of units having known resistance to bond-rupture under thermal, oxidative and hydrolytic conditions.

Tentative U.S. Pat. No. 5,003,039, to be issued Mar. 26, 1991, to Teddy Keller, based upon U.S. Ser. No. 07/273,430, and wholly incorporated herein by reference, teaches 1,3-bis(3-aminophenoxy)benzene as a curing agent for a rapid synthesis of phthalonitrile resins. This curing agent affords void-free components, but requires an initial processing temperature below 240° C.

Phosphazenes are presently the most important and most thermally characterized of the phosphorous-containing inorganic polymers. Many such polymers with a variety of substituents at the phosphorus have been prepared. They often exhibit useful properties including fire retardancy, low temperature flexibility, and resistance to chemical attack.

Linear polyphosphazenes are commonly synthesized at elevated temperatures involving ring-opening polymerization of cyclic trimers such as hexa-substituted cyclotriphosphazene. The intermediate leading to ring openings of the hexa(amine-substituted cyclotriphosphazene) or the linear poly(amine-substituted phosphazene), if the process occurs during the thermal cure, would be expected to react with the phthalonitrile-based resin systems.

SUMMARY OF THE INVENTION

It is an object of this invention to reduce the cure time for polymerization of phthalonitrile-based monomers or oligomeric resins.

And, it is an object of this invention to polymerize phthalonitrile monomers or oligomeric resins or blends containing such monomers or oligomeric resins below the melting or above the glass transition temperature.

Another object of this invention is to improve the processability of high temperature curing monomers or oligomeric resins.

An another object of this invention is to provide curing agents for processability above 240° C.

A still further object of this invention is to produce materials for composite matrices to be used in applications where the operating temperature is above the operating temperature for conventional high temperature polymers and below the operating temperature for ceramics or metals.

Another object of this invention is to produce phthalonitrile resins which will be thermally and oxidatively stable and have good mechanical properties at temperature in excess of 300° C.

An additional object of this invention is to produce phthalonitrile resins with improved flammability properties.

These and other objects are achieved by polymerizing a phthalonitrile-based monomer(s) or oligomeric resin(s) with an amine-phosphazene capable of reacting with the nitrile groups of the phthalonitrile.

DESCRIPTION OF THE PREFERRED EMBODIMENTS

Phosphazene-containing amines containing at least one amine or substituted amine moiety reactive with the nitrile groups of the phthalonitrile are used as curing agents for phthalonitrile-based monomers or oligomeric resins. Phosphazene-containing amines and their chemistry are described in Mujumdar et al., *Macromolecules,*

1990, 23, pages 14–21; Kumar et al., *J. of Polymer Science: Polymer Chemistry Edition*, Vol. 21, pages 3155–3167 (1983); and Kumar et al., *Macromolescules*, Vol. 16, No. 8, (1983), pages 1250–1257, all of which are wholly incorporated herein by reference. Typically, the curing agents of this invention are phosphazene-containing amines of the following formula:

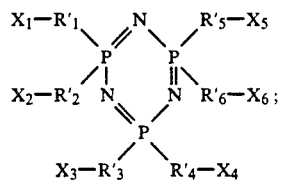

wherein each of $X_{1-6}$ is a hydrogen, an unsubstituted amine group, or an amine group substituted with $C_1$–$C_{12}$ alkyl groups or aromatic groups, at least one of $X_{1-6}$ is an amine group and each of $R'_{1-6}$ is alkyl, aromatic, or alkyl-substituted aromatic moiety. Typically, $R'_{1-6}$-$X_{1-6}$ may include an ether linkage to the phosphorus atom. For example, $R'_{1-6}$-$X_{1-6}$ may be —O—o—$X_{1-6}$. Each of $R'_{1-6}$ may be the same or different. Likewise, each of $X_{1-6}$ may be the same or different.

Upon the application of heat, the cyclic phosphazene-containing amines can polymerize to form high molecular weight linear polymers. The exact nature of the growing chain is not known. The molecular weight will depend on the reaction conditions, e.g., reaction time and temperature. However, when the cyclic phosphazene is present in minute quantities, which is the case in the accompanying examples, high molecular weight linear poly (amine substituted) phosphazenes would not be expected to form. The curing agent can be either a cyclic phosphazene or the corresponding linear polymer.

Any phthalonitrile monomer or oligomeric resin capable of forming polymeric materials can be cured with the amines of this invention. The molecular weight of the phthalonitrile monomer or oligomeric resin is not critical. These curing agents are especially useful for the polymerization of highly aromatic phthalonitriles monomers or oligomeric resins whose processing temperature must exceed 240° C. The advantages of this invention, e.g., improved processing conditions at elevated temperature and enhanced flame retardancy, are best realized for diphthalonitrile monomers or oligomeric resins thereof having no active hydrogen atoms, which are represented by the general formula below:

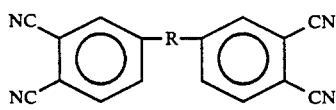

where R is an organic divalent radical linking the terminal phthalonitrile moieties which does not interfere with thermal cure of the phthalonitrile monomer or oligomeric resin by the curing agent. For example, R may be selected from the group consisting of a fluorinated divalent radical linking the terminal phthalonitrile moieties, and an interconnecting group, —Y—R'′—Z—, linking the terminal phthalonitrile moieties, where R″ is an organic divalent radical containing at least one aromatic ring, and Y and Z are independently selected from the group consisting of a divalent aromatic ether group, a divalent aromatic imide group and a divalent thioether group. Y and Z can be the same or different, and refer to moieties directly attached to aromatic ring structures within R″, and do not include the aromatic ring structures to which they are attached. As should be clear from the above definition, Y and Z are attached to the same aromatic ring structure within R″, or to different aromatic ring structures within R″. R″ may include, for example, in addition to the at least one aromatic ring, other aromatic rings, alkyl or alkylidene groups, or other acyclic hydrocarbon radicals. Aromatic rings within R″ may be bridged by one or more alkylidene groups or other acyclic divalent hydrocarbon radicals or ether groups, sulfone groups, imide groups, thioether groups, carbonyl groups, or other divalent linking groups, and R″ may include various functional groups other than those specifically addressed above, either as substitutions on the aromatic ring or rings or as substitutions on an acyclic hydrocarbon radical within R″. The above examples of R and R″ should not be construed as limiting. Phthalonitriles where any other divalent radicals link the terminal phthalonitrile moieties should also be advantageously curable according to the present invention. R and R″ may include more than one of the above groups and may contain a combination of the groups, such as an aromatic imide-containing group.

Phosphorus-containing polymeric materials have been shown to exhibit flame retardancy. In this invention the incorporation of phosphorus into the phthalonitrile-based resin is through the use of aromatic amine-substituted cyclo-and/or linear-phosphazenes as curing agents. Moreover, hexakis (4-aminophenoxy) cyclotriphosphazene is thermally stable up to temperature approaching 400° C., which enhances its important for curing at elevated temperatures.

The curing polymerization reaction can be performed by heating the phthalonitrile to a temperature in the range from above its melting point to about its decomposition temperature, mixing the curing agent in the amount of from about 1 to about 20 percent of total resin weight. The preferred heating is at a temperature in the range of from about 240° C. to about 400° C. The most preferred heating is at a temperature in the range from about 260° C. to about 325° C. The preferred amount of curing agent is from about 1 to about 10 per cent of total resin weight. The most preferred amount of curing agent is from about 1 to about 5 per cent. A subsequent postcuring at elevated temperatures improves the mechanical and thermal properties.

Alternatively, the monomer/oligomeric resin-curing agent mixture can be heated to any viscosity desired by a fabricator and quenched at a stage before gelation occurs. The resulting prepolymer can be stored indefinitely at room temperature without further reaction. When needed, the prepolymer can be processed above the glass transition temperature, which has been greatly suppressed relative to the original melting point of the monomer or oligomeric resin. The cure cycles would be the same as those recommended above. The stability of the prepolymer at ambient temperature is particularly appealing for the preparation of prepregs and their applications as laminates for fiber-reinforced composites This invention makes it possible to reduce the time and temperature needed for polymerization of highly aromatic phthalonitrile monomers or oligomeric resins. Moreover, these new amine curing agents reduce the potential void problems associated with phthalonitrile resins that have to be processed to a thermally cured composition at temperatures approaching the thermal stability of currently used aromatic amine curing agents. In addition, polymeric compositions can be fabricated with consistent properties since curing agents of this invention do not volatilize during the polymerization reaction.

Having described the invention, the following examples are given to illustrate specific applications of the invention including the best mode now known to perform the invention. These specific examples are not intended to limit the scope of the invention described in this application.

EXAMPLES

EXAMPLE 1

Degassed 4,4'-bis (3,4-dicyanophenoxy) biphenyl (1.5 g, 3.42 mmol) and hexakis (4-aminophenoxy) cyclotriphosphazene (0.03 g, 0.038 mmol, 2% by weight) were weighed into an aluminum planchet, melted on a hot plate at 240° C., and mixed by stirring. The amorphous mixture was then transferred to an oven preheated at 250° C. Within a span of 1 hour, the sample had gelled. The mixture was cured in an air circulating oven by heating at 250° C. for 17 hours, at 280° C. for 6 hours, and at 315° C. for 16 hours. The sample was further postcured in sequence at 350° C. for 4 hours and at 375° C. for 12 hours. Thermogravmetric analysis (TGA) and differential scanning calorimetric (DSC) studies showed improvements in the thermal properties as the curing and postcuring temperatures were increased.

EXAMPLE 2

To the degassed melt of a imide-containing phthalonitrile (0.50 g, 0.66 mmol) prepared from 3, 3',4,4'-benzophenonetetracarboxylic dianhydride (BTDA) and 4-(3-aminophenoxy) phthalonitrile at 250° C. was added hexakis (4-aminophenoxy) cyclotriphosphazene (0.010 g, 0.013 mmol, 2% by weight) with stirring. After 15–20 minutes, the sample had almost gelled. The sample was cured by heating in an oven at 250° C. for 12 hours, at 280° C. for 6 hours and at 315° C. for 16 hours. The cured sample did not have any observable voids. The sample was postcured in sequence at 350° C. for 4 hours and at 375° C. for 12 hours under an argon atmosphere. Thermal analyses showed improvements in the thermal and oxidative stabilities as the curing and postcuring temperatures were increased.

EXAMPLE 3

Degassed 2, 2-bis[4-(3, 4-dicyanophenoxy)]hexafluoropropane (1.75 g, 2.98 mmol) was weighed into an aluminum planchet, melted, and hexakis (4-aminophenoxy) cyclotriphosphazene (0.035 g, 0.045 mmol, 2% by weight) was added with stirring at 260° C. The sample was then placed in an oven and cured by heating at 260° C. for 7 hours, at 280° C. for 6 hours, and at 315° C. for 16 hours. An enhancement in the glass transition temperature and improvements in the thermal properties were realized by postcuring the sample under an inert atmosphere at elevated temperatures.

EXAMPLE 4

To degassed 2, 2-bis[4-(3, 4-dicyanophenoxy) phenyl]hexafluoropropane (7.01 g, 11.90 mmol) in the melt state at 240° C. was added hexakis (4-aminophenoxy) cyclotriphosphazene (0.19 g, 0.24 mmol, 2.7% by weight) with stirring. After 30 minutes, the sample was fairly viscous. Moreover, the sample had been converted completely into the amorphous phase. Curing was achieved by heating the mixture at 250° C. for 6 hours, at 290° C. for 6 hours, and at 315° C for 16 hours.

EXAMPLE 5

Degassed 4,4'-bis (3,4-dicyanophenoxy) biphenyl (1.75 g, 3.99 mmol) and hexakis (4-aminophenoxy) cyclotriphosphazene (0.035 g, 0.044 mmol, 2% by weight) were mixed in an aluminum planchet at 250° C. and cured by heating at 250° C. for 16 hours, at 280° C. for 6 hours, and at 315° C. for 16 hours. The sample was then postcured under an argon atmosphere at 350° C. for 4 hours and at 375° C. for 12 hours. The sample was then machined to ⅛ inch thick. Isothermal studies on sample at 357° C. (675° F.) for 100 hours in flow of air at 100 cc/min showed 7.2% weight loss.

EXAMPLE 6

Degassed 2,2-bis[4-(3,4-dicyanophenoxy)phenyl]hexafluoropropane (1.75 g, 2.98 mmol) and hexakis (4-aminophenoxy) cyclotriphosphazene (0.035 g, 0.045 mmol, 2% by weight) were mixed in an aluminum planchet at 250° C. and cured by heating at 250° C. for 16 hours, at 280° C. for 6 hours, and at 315° C. for 16 hours. The sample was then postcured under an argon atmosphere at 350° C. for 4 hours and at 375° C. for 12 hours. The machined sample (⅛ inch thick) was used for isothermal studies. When heated for 100 hours at 357° F. (675° C.) in an air flow of 100cc/min, the sample showed a 4.3% weight loss.

EXAMPLE 7

An identical sample was prepared as in Example 6 and used for isothermal studies at 343° C. (650° F.). When heated for 100 hours in an air flow of 100 cc/min, the sample showed a 1.3 weight loss.

EXAMPLE 8

An imide-containing phthalonitrile (0.80 g, 1.06 mmol) prepared from 3,3',4,4'-benzophenonetetracarboxylic dianhydride (BTDA) and 4-(3-aminophenoxy) phthalonitrile was mixed with 4,4'-bis(3,4-dicyanophenoxy) biphenyl (0.20 g, 0.46 mmol) in the melt at 280° C. state and degassed at reduced pressure. To the resulting blend was added hexakis (4-aminophenoxy) cyclotriphosphazene (0.02 g, 0.025 mmol, 2% by weight) with stirring. The resulting sample was cured by heating at 260° C. for 16 hours, at 280° C. for 6 hours, and at 315° C. for 16 hours. The sample was postcured in sequence under an argon atmosphere at 350° C. for 4 hours and at 375° C. for 12 hours. Thermogravmetic analysis (TGA) and differential scanning calorimetric (DSC) studies showed improvements in the thermal properties as the curing and postcuring temperatures were increased.

EXAMPLE 9

To a degassed sample of 4,4'-bis(3,4-dicyanophenoxy) biphenyl (4.94 g, 11.28 mmol) in the melt at 240° C. was added hexakis (4aminophenoxy) cyclotriphosphazene (0.074 g, 0.094 mmol, 1.5% by weight) with stirring. The resulting sample was cured by heating at 240° C. for 16 hours, at 280° C. for 6 hours, and at 315° C. for 16 hours.

EXAMPLE 10

To a degassed sample of 4,4'-bis(3,4-dicyanophenoxy) biphenyl(5.35 g, 12.21. mmol) in the melt at 240° C. was added hexakis(4-aminophenoxy) cyclotriphosphazene (0.053 g, 0.068 mmol, 1,0% by weight) with stirring. The resulting sample was cured by heating at 240° C. for 16 hours, at 280° C. for 6 hours, and at 315° C. for 16 hours.

EXAMPLE 11

An imide-containing phthalonitrile (0.50 g, 0.39 mmol) prepared from 4,4'-(hexafluoroisopropylidene) diphthalic anhydride and 1,3-bis (3-diaminophenoxy) benzene followed by end-capping with 4-aminophthalonitrile was mixed with 2,2-bis [4-(3,4-dicyanophenoxy)phenyl]hexafluoropropane (0.10 g, 0.17mmol) in the melt state at 310° C. and degassed at reduced pressure. To the resulting mixture (blend) at 310° C. was added hexakis (4-aminophenoxy) cyclotriphosphazene (0.006 g, 0.0076 mmol, 1% by weight) with stirring. The mixture was placed in an oven and cured by heating at 315° C. for 16 hours. The polymer was then postcured under an argon atmosphere in sequence at 350° C. for 4 hours and at 375° C. for 12 hours. The postcure treatment enhanced the thermal properties.

EXAMPLE 12

An imide-containing phthalonitrile (0.40 g, 0.31 mmol) prepared from 4,4'-(hexafluoroisopropylidene) diphthalic anhydride and 1,4-bis(4-aminophenoxy) benzene, followed by end-capping with 4-aminophthalonitrile was mixed with 2,2-bis [4-(3,4-dicyanophenoxy)-phenyl]hexafluoropropane (0.01 g, 0.17 mmol) in the melt state at 310° C. and degassed at reduced pressure. To the resulting mixture (blend) at 310° C. was added hexakis (4-aminophenoxy) cyclotriphosphazene (0.01 g, 0.013 mmol, 2% by weight) with stirring. The mixture was then cured in an oven by heating at 315° C. for 16 hours. The thermal properties were enhanced by postcuring under an argon atmosphere in sequence at 350° C. for 4 hours and at 375° C. for 12 hours.

EXAMPLE 13

An imide-containing phthalonitrile (0.60 g, 0.47 mmol) prepared from 4,4'-(hexafluoroisopropylidene) diphthalic anhydride and 1,3-bis (3-aminophenoxy) benzene, followed by end-capping with 4-aminophthalonitrile was mixed with 2,2-bis [4-(3,4-dicyanophenoxy)-phenyl]hexafluoropropane (0.40 g, 0.68 mmol) in the melt state at 310° C. and degassed at reduced pressure. To the resulting mixture (blend) at 310° C. was added hexakis (4-aminophenoxy) cyclotriphosphazene (0.01 g, 0.013 mmol, 1% by weight) with stirring. The mixture was then cured in an oven by heating at 315° C. for 20 hours. The thermal properties were enhanced by postcuring under an argon atmosphere in sequence at 350° C. for 4 hours and at 375° C. for 12 hours.

EXAMPLE 14

An imide-containing phthalonitrile (0.25 g, 0.19 mmol) prepared from 4,4'-(hexafluoroisopropylidene) diphthalic anhydride and 1,3-bis (3-aminophenoxy) benzene, followed by end-capping with 4-aminophthalonitrile was mixed with 2,2-bis [4-(3,4-dicyanophenoxy)-phenyl]hexafluoropropane (0.25 g, 0.42 mmol) in the melt state at 310° C. and degassed at reduced pressure. To the resulting mixture (blend) at 270° C. was added hexakis (4-aminophenoxy) cyclotriphosphazene (0.02 g, 0.026 mmol, 4% by weight) with stirring. The sample was cured by heating at 270° C. for 2 hours and at 315° C. for 16 hours. The mixture quickly increased in s viscosity and gelation had occurred after 30 minutes.

Obviously, many modifications and variations of the present invention are possible in light of the above teachings. It is therefore to be understood that, within the scope of the appended claims, the invention may be practiced otherwise than as specifically described.

What is claimed is:

1. Curable mixture comprising:
   a phthalonitrile, said phthalonitrile having the formula:

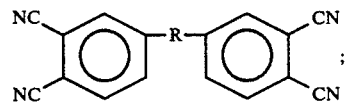

and a linear poly(amine-substituted phosphazene) produced by ring-opening polymerization of a phosphazene-containing amine monomer having the formula:

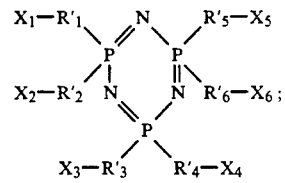

in an amount effective to significantly accelerate the heat-curing rate of said phthalonitrile;

where R is an organic divalent radical, linking the terminal phthalonitrile moieties, which does not interfere with thermal cure of said phthalonitrile by the curing agent; each of $X_{1-6}$ is a hydrogen, an unsubstituted amine group, or an amine group substituted with $C_1$-$C_{12}$ alkyl groups or aromatic groups; at least one of $X_{1-6}$ is an amine group; and each of $R'_{1-6}$ is an alkylene, aromatic, or alkyl-substituted aromatic moiety.

2. The curable mixture of claim 1, wherein said phthalonitrile is thermally curable only at temperature in excess of 240° C.

3. The curable mixture of claim 1, wherein R is selected from the group consisting of a fluorinated divalent radical linking the terminal phthalonitrile moieties, and an interconnecting group, —Y—R''—Z—, linking the terminal phthalonitrile moieties, where R'' is an organic divalent radical containing at least one aromatic ring, and Y and Z are independently selected from the group consisting of a divalent aromatic ether group, a divalent aromatic imide group and a divalent thioether group.

4. The curable mixture of claim 1 wherein R includes an aromatic imide group.

5. The curable mixture of claim 1, wherein at least one of $R'_{1-6}$-$X_{1-6}$ includes an ether linkage to the phosphorus atom of said phosphazene.

6. The curable mixture of claim 3, wherein each of $R'_{1-6}$-$X_{1-6}$ is —O—o—$X_{1-6}$.

7. A method for curing a curable phthalonitrile, comprising the steps of:

mixing, as a curing agent, a linear poly(amine-substituted phosphazene produced by ring-opening polymerization of a phosphazene-containing amine monomer having the formula:

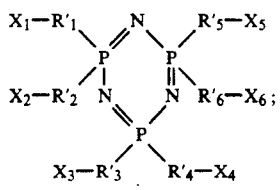

with said phthalonitrile, said phthalonitrile having the formula:

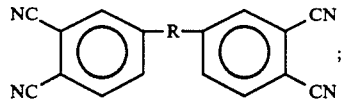

in an amount effective to significantly accelerate the heat-curing rate of said phthalonitrile, thus forming a mixture;

thermally curing said mixture at a temperature at which said phthalonitrile cures to a desired viscosity;

where R is an organic divalent radical, linking the terminal phthalonitrile moieties, which does not interfere with thermal cure of said phthalonitrile by the curing agent, each of $X_{1-6}$ is a hydrogen, an unsubstituted amine group, or an amine group substituted with $C_1$-$C_{12}$ alkyl groups or aromatic groups; at least one of $X_{1-6}$ is an amine group; and each of $R'_{1-6}$ is an alkylene, aromatic, or alkyl-substituted aromatic moiety.

8. The method of claim 7, further comprising the step of heating the phthalonitrile to a temperature in the range from about the melting point thereof to about the decomposition temperature thereof before said mixing step, and wherein said mixing step comprises adding said curing agent to said heated phthalonitrile.

9. The method of claim 7, wherein said mixture comprises said curing agent in an amount of from about 1 to about 20 percent of total phthalonitrile weight.

10. The method of claim 9, wherein said mixture comprises said curing agent in an amount of from about 1 to about 10 percent of total phthalonitrile weight.

11. The method of claim 10, wherein said mixture comprises said curing agent in an amount of from about 1 to about 5 percent of total phthalonitrile weight.

12. The method of claim 7, wherein said mixture is cured by heating at about 240° C. to about 400° C.

13. The method of claim 12, wherein said mixture is cured by heating at about 260° C. to about 325° C.

14. The method of claim 7, wherein each of $R'_{1-6}$-$X_{1-6}$ is —O—o—$X_{1-6}$.

15. A cured phthalonitrile produced according to the process of claim 7.

* * * * *